June 13, 1950            E. A. WATERTON            2,511,186
DEAD BAIT AND DEAD BAIT TACKLE FOR FISHING
Filed May 24, 1948
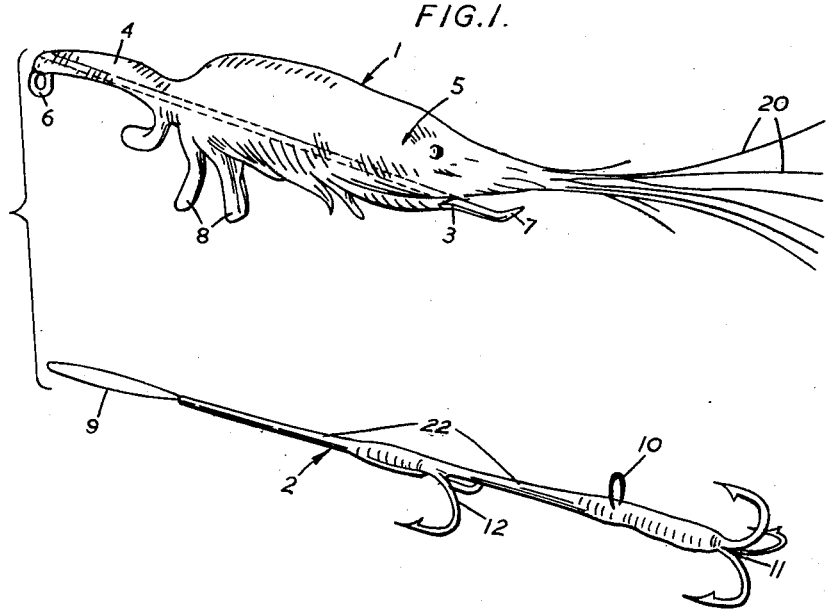
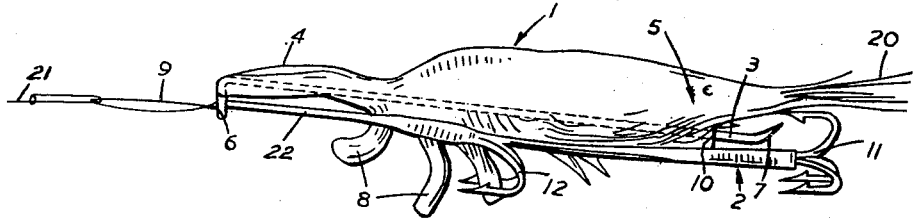
Inventor
EDMUND ALFRED WATERTON, DECEASED
BY DOUGLAS JAMES WATHERSTON DRYBURGH, ADMINISTRATOR
By
*Lucke Lucke*
Attorney Patented June 13, 1950

2,511,186

UNITED STATES PATENT OFFICE 2,511,186

DEAD BAIT AND DEAD BAIT TACKLE FOR FISHING

Edmund Alfred Waterton, deceased, late of London, England, by Douglas James Watherston Dryburgh, administrator, London, England, assignor to E. G. Watershaw, Inc., Dover, Del., a corporation of Delaware Application May 24, 1948, Serial No. 28,946
In Great Britain November 25, 1947

5 Claims. (Cl. 43—44.2)

The invention concerns improvements in or relating to dead bait for fishing and to dead bait fishing tackle, particularly of the kind in which a dead prawn, fish or other appropriate dead bait is mounted upon a flight of hooks so as to be capable of sliding up the fishing line when a fish is hooked, whereby the bait is unlikely to be destroyed and consequently can be used again. Bait according to the present invention is particularly suitable for salmon fishing.

According to this invention there is provided dead bait in the form of a prawn, fish or the like adapted to be mounted adjacent a hook or flight of hooks carried by a fishing line so as to be capable of sliding up the fishing line when a fish is hooked, said bait being provided adjacent one end with an attachment member in the form of a loop through which the fishing line and the shaft of the hook or flight of hooks are, in use, threaded, and adjacent the other end with a second attachment member including a projecting portion adapted in use releasably to be held in a retaining loop secured to the fishing line or the shaft of hook or flight of hooks.

In the co-pending application Serial No. 28,456, filed May 21, 1948, there is described an improved form of dead bait which, after being subjected to a preservation treatment, is coated entirely with a waterproof coating or sealing material which leaves the bait flexible to a substantial degree and which itself remains of non-brittle flexible character for a considerable period.

A preferred form of the waterproof coating or sealing material is made up as follows:

| | Parts |
|---|---|
| Vinylite resin VYHH | 28 |
| Di-octyl phthalate | 10 |
| Acetone | 9 |
| Methyl ethyl ketone | 16 |
| Methyl isobutyl ketone | 8 |
| Xylol | 29 |

Dead bait according to the present invention is also conveniently submitted to the preservation treatment and coated as described in my above mentioned co-pending application.

Conveniently both attachment members are carried by a single metal insert passed through the body of the dead bait before the latter is subjected to the preservation and coating treatments described in my above mentioned co-pending application.

A prawn, shrimp or the like normally moves backwards and therefore the head thereof is in use directed towards the end of the fishing line so that the movement of the prawn, shrimp or the like up the line resembles that of a live prawn, shrimp or the like.

Further to enhance the life like appearance of dead bait in the form of a prawn, shrimp or the like the latter may be provided with artificial whiskers or feelers. These may, for example, be made from fine flexible threads of plastic material such as nylon.

In order that the nature of the invention and the method of carrying same into effect may be more thoroughly understood one embodiment of same will now be described with reference to the accompanying drawings in which—

Figure 1 shows a dead bait in the form of a prawn and a flight of hooks for use in conjunction therewith, the two being shown separated.

Figure 2 shows the dead bait and flight of hooks shown in Figure 1 assembled for use.

The embodiment shown in the drawings comprises two separable parts, a dead bait 1 in the form of a prawn and a flight of hooks 2.

The dead prawn bait 1 is provided with a stiff wire insert 3 substantially equal in length to the body of the prawn, such insert being passed through the belly of the prawn from adjacent the underside of the tail 4 to emerge on the underside of the head 5. The rear end of the insert, which when in position, lies under the tail 4 of the prawn is downwardly cranked and formed into an attachment member in the form of a small loop 6 the plane of which is vertical and at right angles to the rest of the insert. A second attachment member is formed by the front end 7 of the insert which is pointed and also cranked upwardly through an angle of approximately thirty degrees.

The insert 3 is positioned in the prawn after the latter has been submitted to the preservation treatment and before application of the waterproof sealing or coating material as described in my above mentioned co-pending application. The feelers 8 of the prawn are pulled out and set in a life-like position. Finally to enhance the life-like appearance of the prawn, artificial whiskers 20 are fixed to the stubs of the original whiskers. For this purpose fine flexible threads of plastic material, such as nylon, may be employed and may be secured by means of a suitable adhesive.

The flight of hooks 2, as shown in the drawings, has a shaft 22 provided at its inner end with a wire loop 9 for attaching the flight to the end of a fishing line. Adjacent the other or outer end of the shaft 22 there is secured a retaining loop 10 for the dead prawn bait 1 in the form of a small upstanding loop of wire. The flight of hooks includes at its outer end a three pronged hook 11 and centrally a two pronged hook 12, the latter being arranged on the opposite side of the flight to the retaining loop 10. The whole flight of hooks is bound with suitable thread and then coated with the same waterproof sealing or coating material as the dead prawn bait.

In use the loop of wire 9 at the inner end of the flight of hooks is passed through the small loop 6 at the rear end of the wire insert 3 in the dead prawn bait and is then attached to a fishing line 21. The front end 7 of the wire insert 3 is then passed through the retaining loop 10 adjacent the outer end of the flight or hooks. As the front end 7 of the wire insert 3 is upwardly cranked the dead prawn bait will be held in position on the flight of hooks, the two pronged hook 12 extending downwardly from under the prawn's belly and the three pronged hook 11 being drawn close under the head 5 of the prawn.

When throwing out or pulling in a line with dead bait, as above described, attached thereto, the bait will tend to move towards the outer end of the flight of hooks, but when a fish makes a bite it will tend to push the bait up the line and in so doing become impaled on the hooks. The front end 7 of the wire insert, though sufficient to retain the dead prawn bait in position when throwing out or pulling in a line, easily becomes detached from the retaining loop 10 if pushed in a direction up the line 21. The dead prawn bait remains attached to the line 21 as the latter passes through the small loop 6 at the rear end of the wire insert 3.

Though the invention has been described with reference to a prawn it will be apparent that other marine creatures such as small fish could equally well be employed.

It is claimed:

1. In combination, dead bait for fishing in the form of a small marine creature such as a prawn and a hook and shaft for said hook, said bait including an attachment member in the form of a loop carried by one end of the body of the creature, and a second attachment member including a projecting portion and carried by the other end of the creature; said hook shaft including a retaining loop secured thereto for releasable engagement with said projecting portion of said second attachment member, said hook shaft being adapted to be attached, at the end thereof opposite to the hook, to a fishing line; and said attachment loop being adapted for slidably embracing said hook shaft.

2. In combination, dead bait for fishing in the form of a small marine creature such as a prawn and a hook and shaft for said hook, said bait including a metal insert passed through the body of the creature and projecting at each end therefrom, an attachment member in the form of a loop carried by one projecting end of said metal insert and a second attachment member carried by the other projecting end of said metal insert; said hook shaft including a retaining loop secured thereto for releasable engagement with said projecting portion of said second attachment member, said hook shaft being adapted to be attached, at the end thereof opposite to the hook, to a fishing line; and said attachment loop being adapted for slidably embracing said hook shaft.

3. In combination, dead bait for fishing in the form of a small marine creature such as a prawn and a hook and shaft for said hook, said bait including a metal insert passed through the body of the creature and projecting at each end therefrom; an attachment member formed integrally with said metal insert at one end thereof and in the form of a loop the plane of which is vertical and at right angles to the rest of the said metal insert, and a second attachment member formed by the other projecting end of said metal insert and which end is pointed and cranked upwardly through an angle of approximately thirty degrees, said hook shaft including a retaining loop secured thereto for releasable engagement with said projecting upwardly cranked end of said second attachment member, said hook shaft being adapted to be attached, at the end thereof opposite to the hook, to a fishing line; and said attachment loop being adapted for slidably embracing said hook shaft.

4. In combination, dead bait for fishing in the form of a small marine creature such as a prawn and a flight of hooks and shaft for said hooks, said bait including a metal insert passed through the body of the prawn and projecting at each end therefrom, an attachment member in the form of a loop formed integrally with one projecting end of said metal insert for slidably embracing the shaft of said flight of hooks and a second attachment member formed by the other projecting end of said metal insert; and said flight of hooks including a retaining loop adapted to be releasably held by said second attachment member.

5. Dead bait for fishing for use in combination with a hook, a shaft for said hook and a retaining loop secured on said shaft, said bait comprising a prawn, a coating of waterproof material sealing the exterior of said prawn, a rigid wire insert passing through the body of the prawn and projecting at each end through said waterproof coating, an attachment member formed integrally with one projecting end of said wire insert for slidably embracing the shaft of said hook and a second attachment member formed integrally with the other projecting end of said wire insert for releasable engagement with said retaining loop.

DOUGLAS JAMES WATHERSTON DRYBURGH,
*Administrator under the Last Will and Testament of Edmund Alfred Waterton, deceased.*

REFERENCES CITED

The following references are of record in the file of this patent:

UNITED STATES PATENTS

| Number | Name | Date |
| --- | --- | --- |
| 1,582,713 | Welch | Apr. 27, 1926 |
| 2,190,449 | Goldammer | Feb. 13, 1940 |
| 2,236,353 | Minser | Mar. 25, 1941 |
| 2,254,949 | Messacar | Sept. 2, 1941 |